US012015855B2

(12) United States Patent
Abuolaim et al.

(10) Patent No.: US 12,015,855 B2
(45) Date of Patent: Jun. 18, 2024

(54) SYSTEM AND METHOD FOR SYNTHESIZING LOW-LIGHT IMAGES

(71) Applicant: SAMSUNG ELECTRONICS CO., LTD., Suwon-si (KR)

(72) Inventors: Abdullah Abuolaim, Toronto (CA); Abhijith Punnappurath, Toronto (CA); Abdelrahman Abdelhamed, Toronto (CA); Michael Scott Brown, Toronto (CA); Aleksai Levinshtein, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 17/566,425

(22) Filed: Dec. 30, 2021

(65) Prior Publication Data
US 2023/0156342 A1 May 18, 2023

Related U.S. Application Data

(60) Provisional application No. 63/280,065, filed on Nov. 16, 2021.

(51) Int. Cl.
H04N 23/73 (2023.01)
H04N 23/74 (2023.01)
H04N 25/60 (2023.01)

(52) U.S. Cl.
CPC ............ *H04N 23/73* (2023.01); *H04N 23/74* (2023.01); *H04N 25/60* (2023.01)

(58) Field of Classification Search
None
See application file for complete search history.

(56) References Cited

U.S. PATENT DOCUMENTS

| 8,786,764 | B2 | 7/2014 | Yamashita et al. |
| 9,406,148 | B2 | 8/2016 | Zhu et al. |
| 11,107,198 | B2 | 8/2021 | Hyun et al. |
| 11,257,237 | B2 | 2/2022 | Bleyer et al. |
| 11,676,394 | B2 | 6/2023 | Ogura |
| 2009/0284618 | A1* | 11/2009 | Kurahashi ............ H04N 23/70 348/222.1 |

(Continued)

FOREIGN PATENT DOCUMENTS

| CN | 112991158 A | 6/2021 |
| CN | 113052768 A | 6/2021 |

(Continued)

OTHER PUBLICATIONS

International Search Report and Written Opinion (PCT/ISA/210 and PCT/ISA/237) dated Feb. 15, 2023, issued by International Searching Authority for International Application No. PCT/KR2022/016955.

(Continued)

*Primary Examiner* — Xiaolan Xu
(74) *Attorney, Agent, or Firm* — Sughrue Mion, PLLC

(57) ABSTRACT

A method of generating a low-light image is provided. The method includes receiving a raw image, removing an amount of first illumination from the raw image, applying a low exposure condition to the raw image having the amount of first illumination removed, and applying an amount of low-light illumination to the raw image having the applied low exposure condition.

17 Claims, 14 Drawing Sheets

(56) References Cited

U.S. PATENT DOCUMENTS

2018/0247201 A1 8/2018 Liu et al.
2019/0129165 A1* 5/2019 Kang .................... G06F 3/0304
2020/0051217 A1 2/2020 Shen et al.

FOREIGN PATENT DOCUMENTS

KR 10-1509992 B1 4/2015
KR 10-2020-0017185 A 2/2020

OTHER PUBLICATIONS

Scheff, "How to Turn Day Into Night in Adobe Photoshop", Apr. 26, 2018, pp. 1-18, Photoshop Star.
Zhu et al., "Unpaired Image-to-Image Translation using Cycle-Consistent Adversarial Networks", arXiv: 1703.10593v7 [cs.CV], Aug. 24, 2020, (18 total pages).
Punnappurath et al., "Day-to-Night Image Synthesis for Training Nighttime Neural ISPs", arXiv:2206.02715v1 [cs.CV], Jun. 6, 2022, (12 total pages).

* cited by examiner

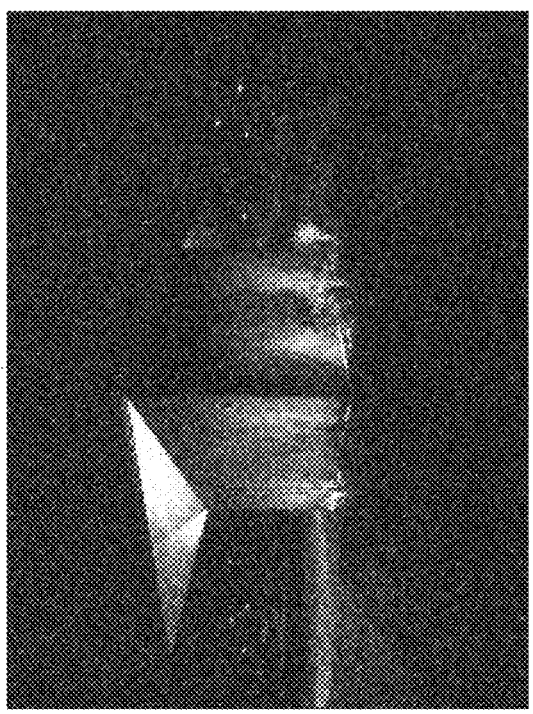
FIG. 3

402
404
406
FIG. 4

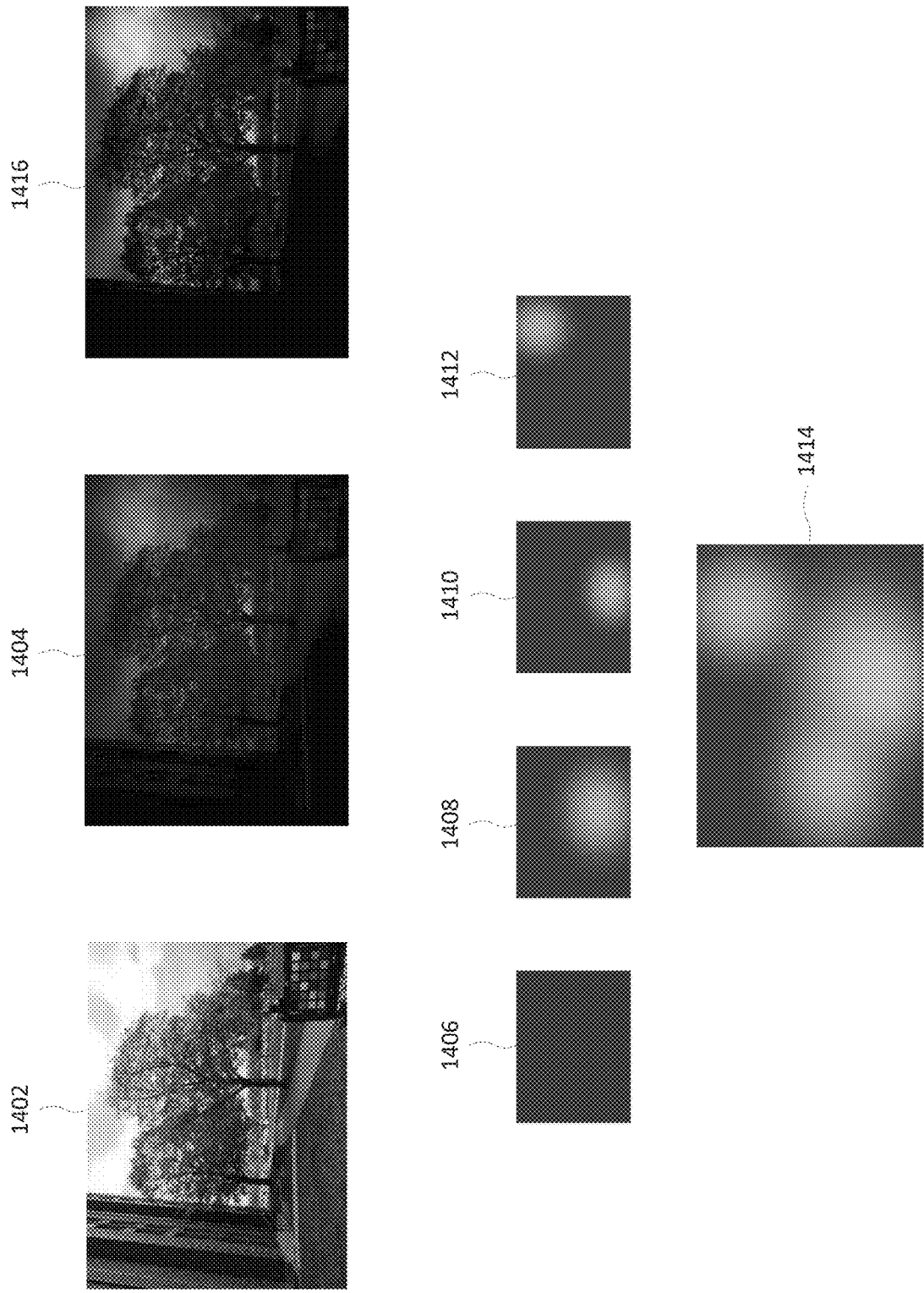

FIG. 15

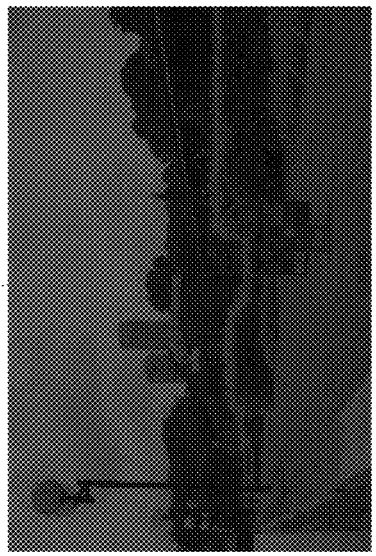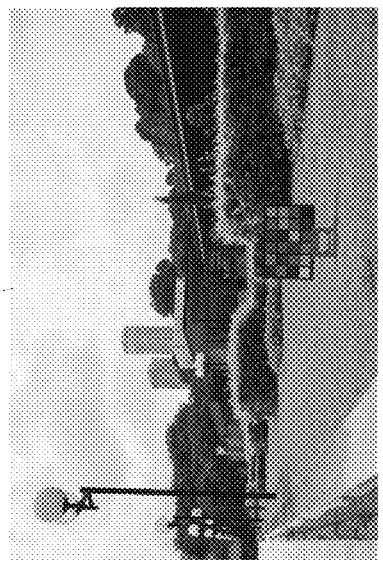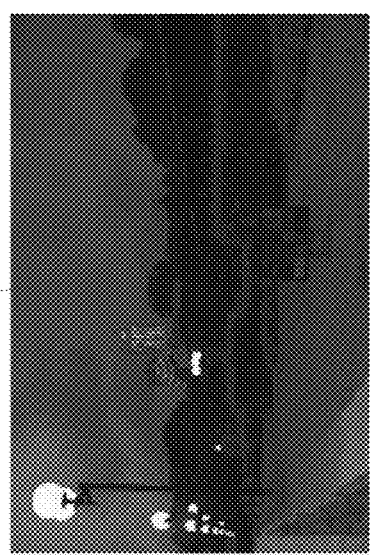
FIG. 17

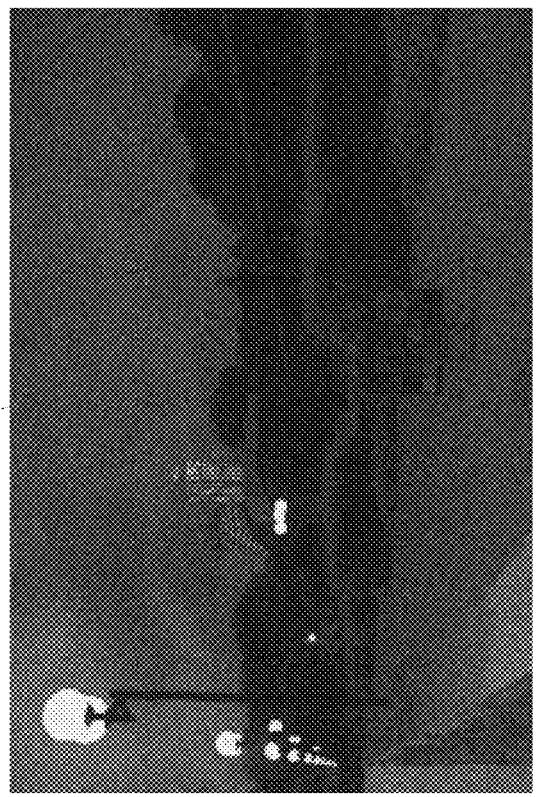
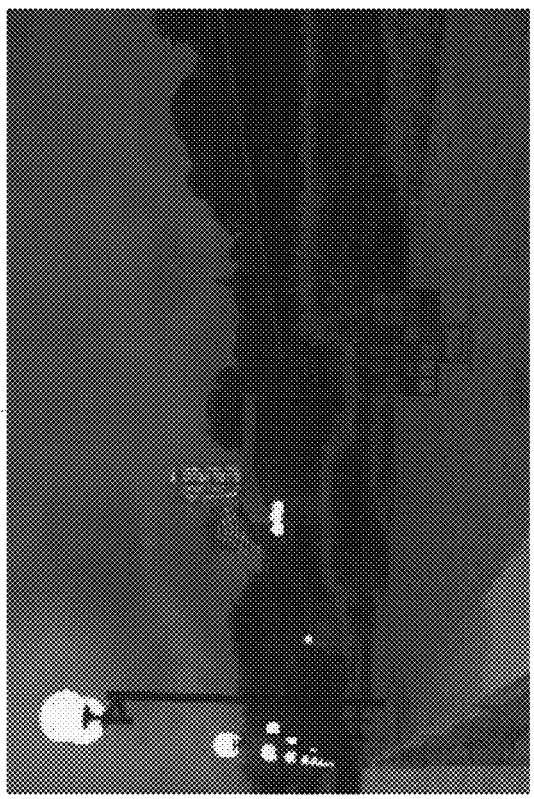
FIG. 18

SYSTEM AND METHOD FOR SYNTHESIZING LOW-LIGHT IMAGES

CROSS-REFERENCE TO RELATED APPLICATION(S)

This application is based on and claims priority under 35 U.S.C. § 119 to U.S. Provisional Application No. 63/280,065, filed on Nov. 16, 2021, the disclosure of which is incorporated herein by reference in its entirety.

BACKGROUND

1. Field

The disclosure relates to a system, method and device for synthesizing low-light images such as nighttime images.

2. Description of Related Art

Capturing images at night and in low-light environments is challenging due to the low photon count hitting the camera sensor. Because of the weak signal, the image must be gained (i.e., using high ISO), which further amplifies the sensor noise. This is particularly troublesome for smartphone cameras, where the sensor's small form factor limits the amount of light per pixel, resulting in significant noise levels in low-light and night environments. When noisy sensor images are processed by the camera's image signal processor (ISP), the noise is often amplified, resulting in noisy and aesthetically unappealing final standard RGB (sRGB) output images. Capturing the scene using a long exposure (e.g., several seconds) is often not viable as it requires the camera to be placed on a tripod to avoid camera shake and the scene needs to remain static to avoid motion blur. Some systems implement neural networks to process a noisy nighttime image to improve the quality of the image. However, a large number of training pairs (e.g., an input noisy image and a ground-truth image) is required, which is expensive and time consuming. Furthermore, the input noisy image and ground-truth images vary from sensor to sensor, meaning that a neural network trained based on a first sensor may not necessarily operate correctly on a second sensor.

SUMMARY

In accordance with an aspect of the disclosure, a method of generating a low-light image may include receiving a raw image, removing an amount of first illumination from the raw image, applying a low exposure condition to the raw image having the amount of first illumination removed, and applying an amount of low-light illumination to the raw image having the applied low exposure condition.

In accordance with an aspect of the disclosure, a system for generating a low-light image may include a memory storing instructions and a processor configured to execute the instructions to receive a raw image, remove an amount of first illumination from the raw image, apply a low exposure condition to the raw image having the amount of first illumination removed, and apply an amount of low-light illumination to the raw image having the applied low exposure condition.

In accordance with an aspect of the disclosure, a non-transitory, computer-readable storage medium may store instructions that, when executed, cause at least one processor to receive a raw image, remove an amount of first illumination from the raw image, apply a low exposure condition to the raw image having the amount of first illumination removed, and apply an amount of low-light illumination to the raw image having the applied low exposure condition.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 3 is a diagram of captured images, according to an embodiment;

FIG. 4 is a diagram of an example of simulating nighttime lighting and noise in an image, according to an embodiment;

FIG. 14 is a diagram of an application of a lighting mask to a raw image, according to an embodiment;

FIG. 15 is a diagram showing an example of an applied lighting mask, according to an embodiment;

FIG. 17 is a diagram showing examples of applying amounts of nighttime illumination to images, according to an embodiment;

FIG. 18 is a diagram of an application of noise to an image, according to an embodiment.

DETAILED DESCRIPTION

The following detailed description of example embodiments refers to the accompanying drawings. The same reference numbers in different drawings may identify the same or similar elements.

Figure 1:
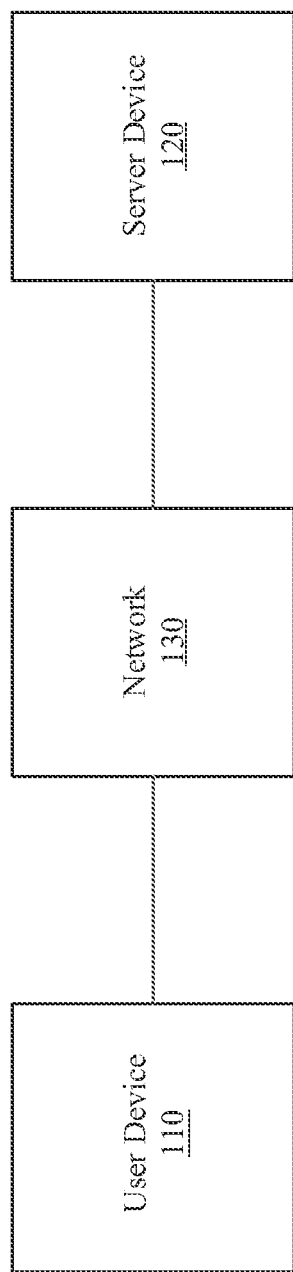
FIG. 1 is a diagram of devices of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 includes one or more devices. For example, the server device 120 may be a server device, a computing device, or the like.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
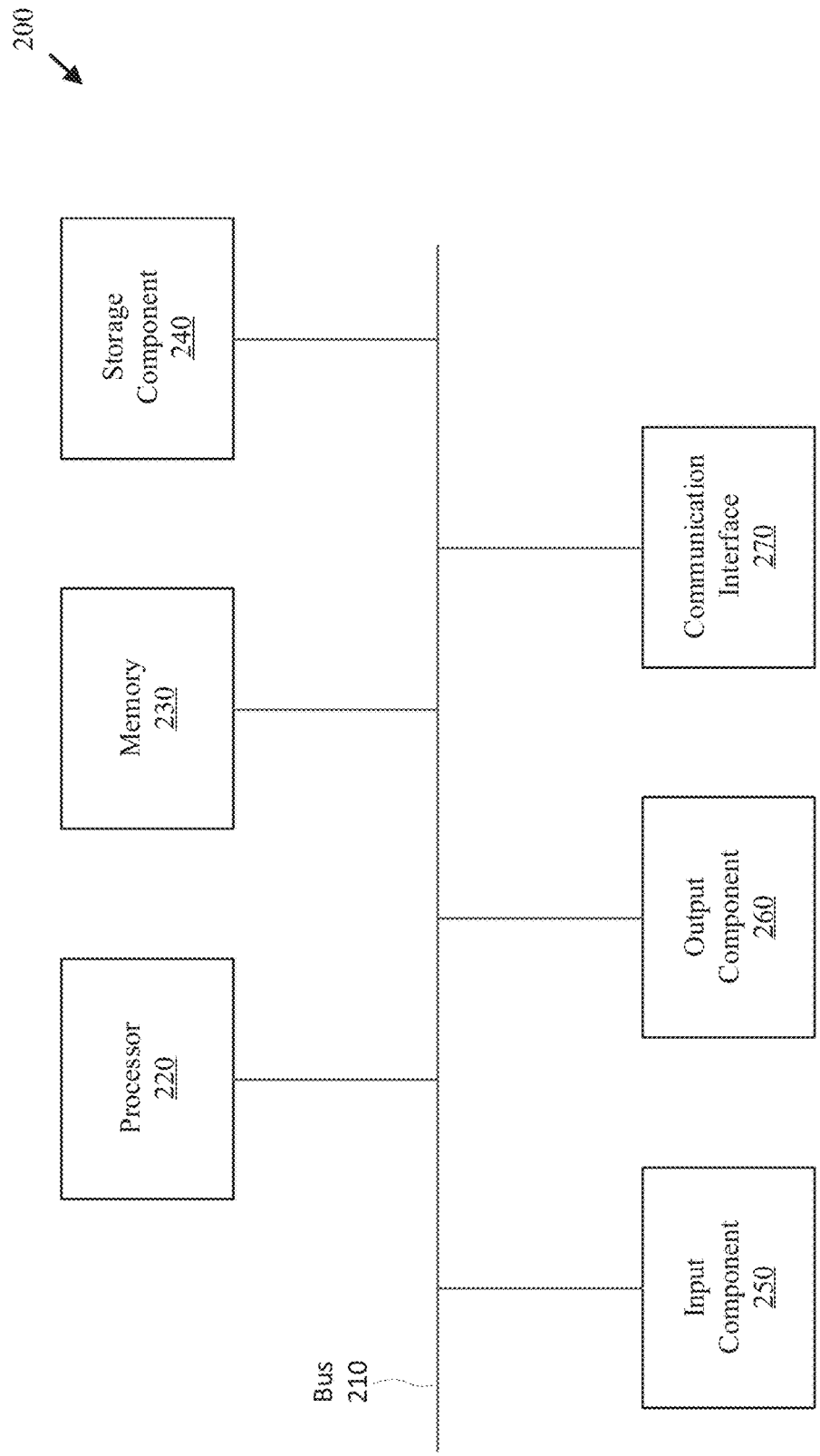
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

FIG. 3 is a diagram of captured images, according to an embodiment. Image 302 is an example of a ground-truth nighttime image and image 304 is an example of a nighttime image captured by a camera or sensor. The ground-truth image 302 may have been captured via long-exposure, by a camera specialized for nighttime capture, etc., whereas image 304 may have been captured by a non-specialized, ordinary camera (e.g., sensor in a portable device). Thus, image 304 includes undesirable noise.

To remove the noise from, for example, image 304, one method may include implementing a neural network, and training the neural network based on the ground-truth image 302 and the noisy image 304. However, capturing nighttime ground-truth images requires significant time and resources (i.e., long exposure capturing, specialized equipment, etc.). Furthermore, the noisy image 304 may be captured from one type of sensor, and any training performed based on the noisy image 304 may not operate correctly for another type of sensor (e.g., different sensors in different portable devices).

Provided herein is a system and method for generating, from daytime or other high-illumination images, images with simulated low-light or nighttime illumination and simulated noise that can be used as pairs to train networks for removing noise from captured low-light or nighttime images. While certain examples in this disclosure refer to "nighttime" and "daytime" images, this disclosure contemplates that the systems and methods disclosed herein may be used to synthesize low-light images from high-illumination images in general.

By generating images with simulated nighttime illumination from captured daytime images, the resources required to properly train a network (e.g., to generate training image pairs) are significantly reduced due to the ease at which quality daytime images can be captured (i.e., due to outdoor, natural lighting, daytime images of sufficient quality can be captured with less expensive equipment and the capturing process does not require long exposure times).

FIG. 4 is a diagram of an example of simulating nighttime lighting and noise in an image, according to an embodiment. According to embodiments of the disclosure, a daytime image 402 may be captured, and nighttime illumination may be simulated on the image 402, as shown by image 404. Additionally, noise may be simulated on the image 404, as shown in image 406. Thus, image 404 and 406 may be used as a training pair, where image 404 functions as the ground-truth image.

Figure 5:
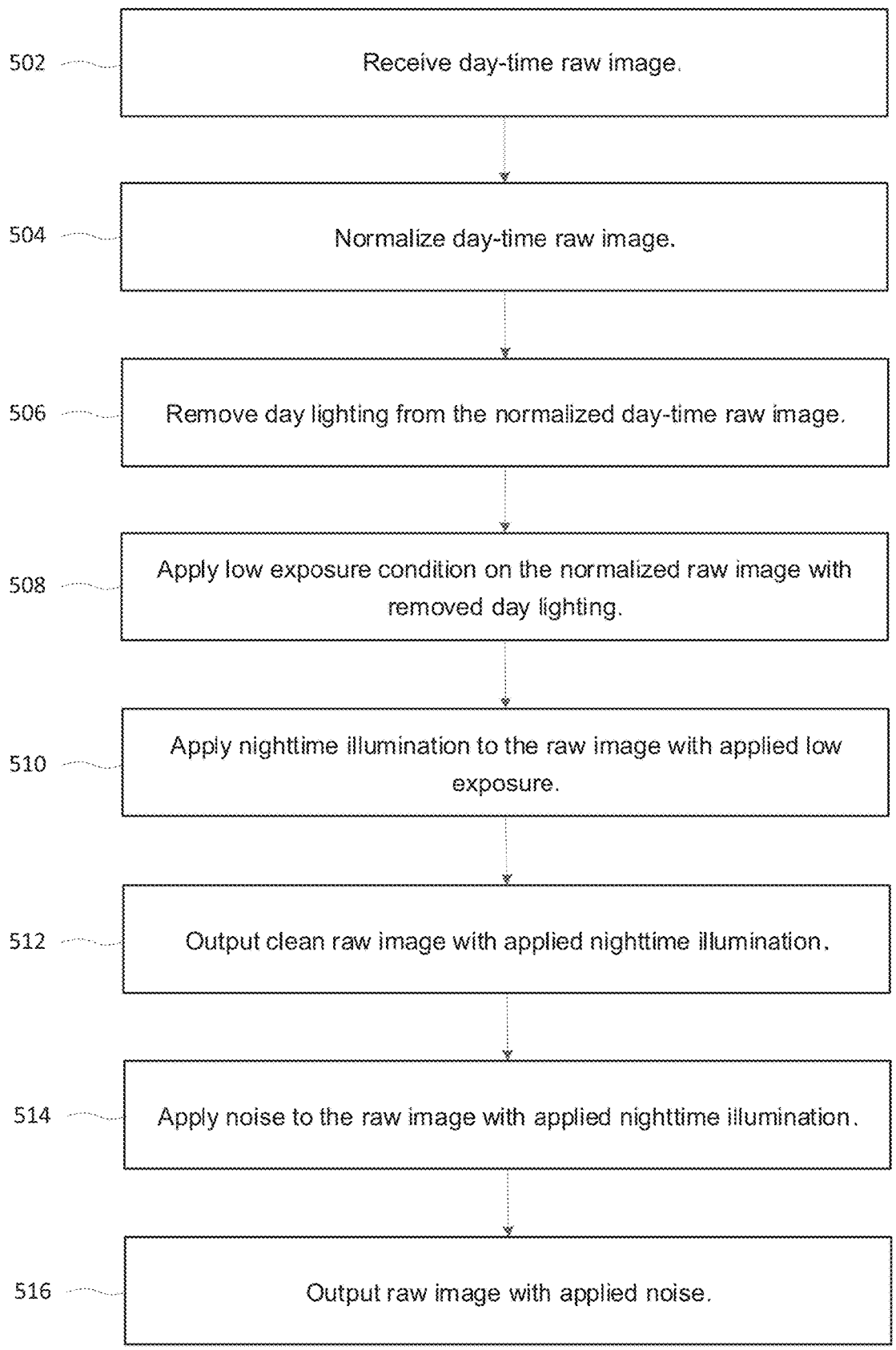
FIG. 5 is a flowchart of a method for generating nighttime images, according to an embodiment.
Figure 6:
FIG. 6 is a diagram of a captured daytime image, according to an embodiment.
Figure 7:
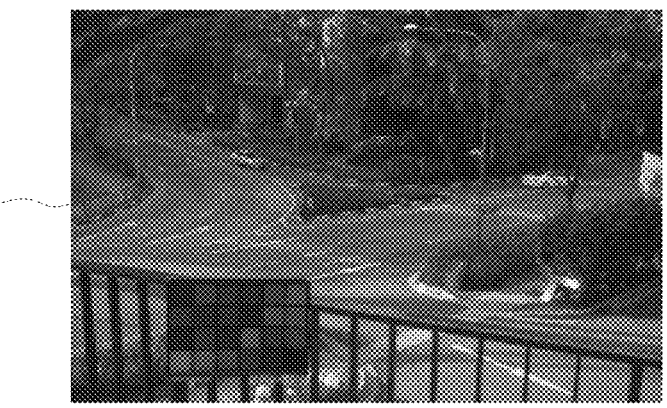
FIG. 7 is a diagram of a daytime raw image, according to an embodiment.

FIG. 5 is a flowchart of a method for generating nighttime images, according to an embodiment. FIG. 6 is a diagram of a captured daytime image, according to an embodiment. FIG. 7 is a diagram of a daytime raw image, according to an embodiment. In operation 502, the system receives a daytime raw image. Image 602 is an example of a captured daytime image as the image would be displayed on a display screen. However, image 702 is an example of the raw daytime image of image 602. The raw image may refer to the image as captured by the sensor before the image is processed (i.e., image 702 may be the raw image and image 602 may be the processed and displayed image). In an embodiment, the image 702 may be denoted as $$I_{day} \in \mathbb{R}^{\frac{H}{2} \times \frac{W}{2} \times 4},$$

where H and W denote the image size in pixels. For visualization purposes, the raw images in the figures have been demosiaced, and gamma has been applied.

Figure 8:
FIG. 8 is a diagram of a normalized daytime raw image, according to an embodiment.

FIG. 8 is a diagram of a normalized daytime raw image, according to an embodiment. In operation 504, the system normalizes the daytime raw image. Image 802 is an example of a normalized daytime raw image. Each pixel of the daytime raw image (e.g., image 702) may have integer values between 0 and a predefined white level setting (e.g., [0. white_level]), where white_level corresponds to the maximum reading value of the sensor. Thus, the system normalizes the daytime raw image to floating point values of 0 to 1 (i.e., the value of 1 replaces the value of white_level). In an embodiment, the normalized image 802 may be denoted as $$I_n = \frac{I_{day} - b_l}{w_l - b_l},$$

where $b_l$ and $w_l$ denote the black-level and white-level provided by the metadata of a camera.

Figure 9:
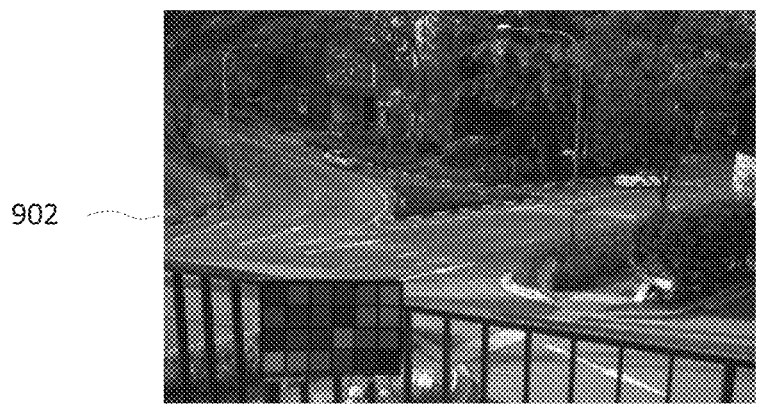
FIG. 9 is a diagram of a daytime raw image with an amount of daytime illumination removed, according to an embodiment.

FIG. 9 is a diagram of a daytime raw image with an amount of daytime illumination removed, according to an embodiment. In operation 506, the system removes day lighting from the normalized daytime raw image. The system may remove day lighting from the normalized daytime image by applying a white balance. In one embodiment, the system may remove day-lighting based on an auto-white-balance (AWB) routine of a camera capturing the raw image. Image 902 is an example of an image with an amount of daytime illumination removed (e.g., having a white balancing operation applied to it). The white balanced image may be represented as $I_w = I_n L_{day}$, where $I_n$ is the normalized image, and $$L_{day} = \text{diag}\left(\frac{1}{r}, \frac{1}{g}, \frac{1}{g}, \frac{1}{b}\right)$$

and $L_{day}$ is determined using the daytime illuminant estimate from the AWB function of the camera. The green-channel values g in $L_{day}$ may be normalized to 1. The system may apply an as-shot neutral to the raw image to white balance the image. The as-shot neutral may refer to the daytime illuminant as estimated by a camera described above and may be provided as metadata with the raw image.

Figure 10:
FIG. 10 is a diagram of a daytime raw image with an applied low exposure condition, according to an embodiment.
Figure 11:
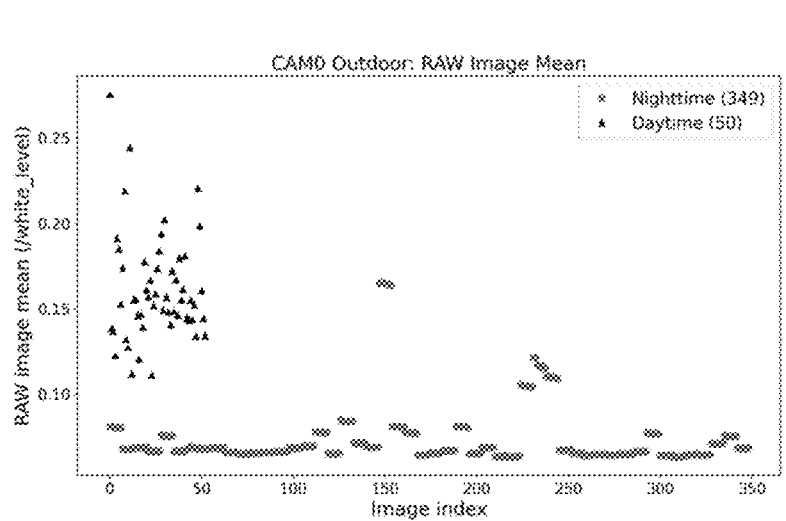
FIG. 11 is a graph showing distribution of average intensity, according to an embodiment.

FIG. 10 is a diagram of a daytime raw image with an applied low exposure condition, according to an embodiment. FIG. 11 is a graph showing distribution of average intensity, according to an embodiment. In operation 508, the system applies a low exposure condition on the normalized raw image with the removed daytime illumination. Image 1002 is an example of an image (e.g., image 902) having an applied low exposure condition. The low exposure condition may be determined based on a sample of nighttime average intensity. Graph 1102 shows a distribution of average intensity for a set of sampled daytime images and nighttime images, and the low exposure condition may be determined based on the average intensity for the set of sampled nighttime images. The system may apply the low exposure condition by multiplying the image (i.e., the pixel values of the image) by a global scale factor. The global scale factor may be determined based on the distribution of average intensity of the set of sampled nighttime images. The global scale factor may also be randomly selected around the distribution of average intensity. Applying the low exposure condition darkens the image, simulating a nighttime image without nighttime illuminations. The resulting darkened image may be expressed as $I_e = I_w * d$, where d corresponds to the global scale factor.

In operation 510, the system applies a nighttime illumination to the raw image with the applied low exposure. The system may apply the nighttime illumination as global single illuminant (e.g., a single illuminant applied to the raw image). The system may also apply the nighttime illumination as one or more local illuminants (e.g., illuminants applied to portions, sections, or specific pixels of the raw image).

Figure 12:
FIG. 12 is a diagram of a raw image with an applied amount of nighttime illumination, according to an embodiment.

FIG. 12 is a diagram of a raw image with an applied amount of nighttime illumination, according to an embodiment. Image 1202 is an example of an image where a global single illuminant is applied. The system may determine a nighttime illuminant from a distribution of nighttime illuminants and then color cast the image 1202 with the determined nighttime illuminant. In some embodiments, the system acquires images of a gray card under different night illuminations (e.g., full nighttime environments, nighttime environments with local lighting and reflections, low-light environments, etc.) to obtain a set or dictionary (e.g., a database) of nighttime illuminations $\mathcal{L}$. To relight the scene with a global single illuminant, the system may randomly sample a nighttime illuminant. The system may fit a two-dimensional Gaussian distribution of joint chromaticity values $$\left(\frac{r}{g} \text{ and } \frac{b}{g}\right)$$

around the database of night illuminations $\mathcal{L}$. Then the system may randomly sample night illuminant y from the distribution as in Equations (1) and (2):

$$y \sim \mathcal{N}(\mu, \Sigma) \quad (1)$$

$$\Sigma = \frac{1}{M}\sum_{i=1}^{M}\left(\left(\left[\frac{r}{g},\frac{b}{g}\right]_i - \mu\right)^T\left(\left[\frac{r}{g},\frac{b}{g}\right]_{i-\mu}\right)\right) \quad (2)$$

where $\mu$ and $\Sigma$ are the mean and covariance of the normalized chromaticity values in $\mathcal{L}$, respectively, M is the number of night illuminants in $\mathcal{L}$, and y, $\mu \in \mathbb{R}^2$, and $\Sigma \in \mathbb{R}^{2\times2}$.

Additionally, or alternatively, the system may apply the nighttime illumination as local illuminants by sampling a small set (e.g., five to seven) of nighttime illuminants. The relit image $I_r$ may be expressed as in Equation (3):

$$I_r = \frac{\left[\sum_{i=1}^{N} I_e L_{night_i} \odot w_i M_i\right]}{\sum_{i=1}^{N} w_i M_i} \quad (3)$$

where $L_{night_i} = \text{diag}(r_i, g_i, g_i, b_i)$, with $i=\{1, \ldots, N\}$, representing the set of night illumination samples. The scalar $w_i$ is used to control the strength of the light source. The mask $M_i$ may be modeled as a two-dimensional Gaussian function $G(x_i, y_i, \sigma_{x_i}, \sigma_{y_i})$. The system may randomly position a light source with a center of $(x_i, y_i)$ that lies within the image excluding, for example, a boundary percentage (e.g., excluding 10% of the image near the edges of the image). The spread of the light source is modulated by $(\sigma_{x_i}, \sigma_{y_i})$, which may be randomly selected between [0.5, 1] of the image size. $I_e$ represents the image with the applied lower exposure condition. The same Gaussian kernel may be applied to all channels (i.e., $M_i \in \mathbb{R}^{\frac{H}{2}\times\frac{W}{2}\times 4}$, where H, W denote the image size in pixels). The operator $\odot$ may denote element wise multiplication. One of the illuminants (e.g., i=1), may be selected as an ambient light, with mask $M_1$ being a mask of all 1s and having a weak strength $w_1$ set between 5% and 10% of the other illuminants. $I_r$ may be denormalized by the white level to obtain the synthetic nighttime image as $I_{night} = I_r (w_l - b_l) + b_l$.

Figure 13:
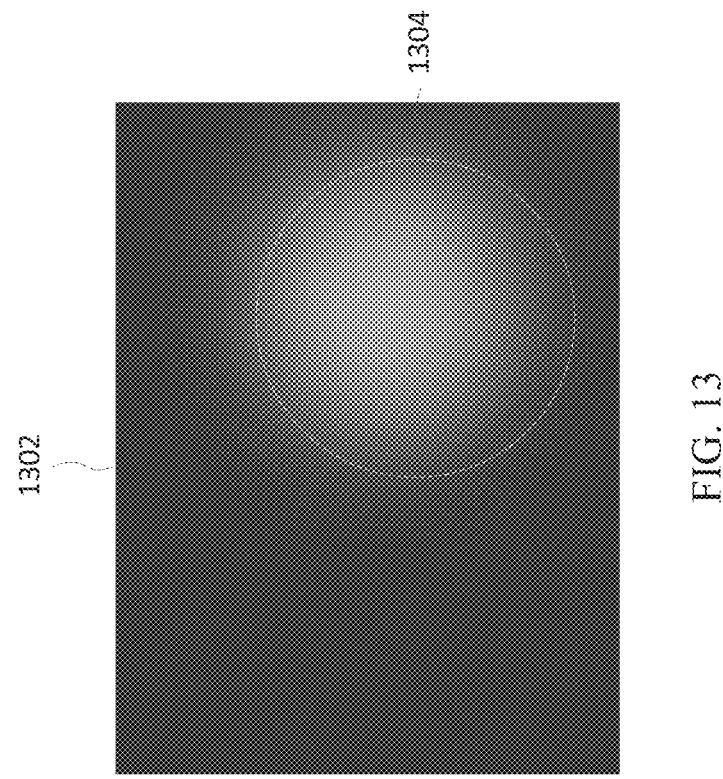
FIG. 13 is a diagram of a relighting mask, according to an embodiment.

FIG. 13 is a diagram of a relighting mask, according to an embodiment. The mask 1302 may include an illumination area 1304 that, when applied to an image, provides a local illumination to the image. The number of illumination areas may be random and/or uniform. The color of the illumination area 1304 may be determined from a random sample from a two-dimensional Gaussian distribution. The location of the illumination area 1304 may be random and/or uniform or at a predetermined location on the mask 1302. The shape of the illumination area 1304 may be determined based on a two-dimensional Gaussian distribution, with an automatically selected sigma. The size of the illumination area 1304 may be random and/or uniform, or may be of a predetermined portion percentage of the mask 1302. The intensity of the illumination area 1304 may be scaled to a maximum level (e.g., 1.0) or at values lower than the maximum level.

Image 1416 may be generated and rendered with an average illuminant $$\left(\text{e.g., } \frac{1}{N}\sum_{i=1}^{N} L_{night_i}\right).$$

FIG. 15 is a diagram showing an example of an applied lighting mask, according to an embodiment. Image 1502 is an example of an image that has been processed according to operations 502-508. Image 1504 is an example where multiple local illuminants have been applied to image 1502.

Figure 16:
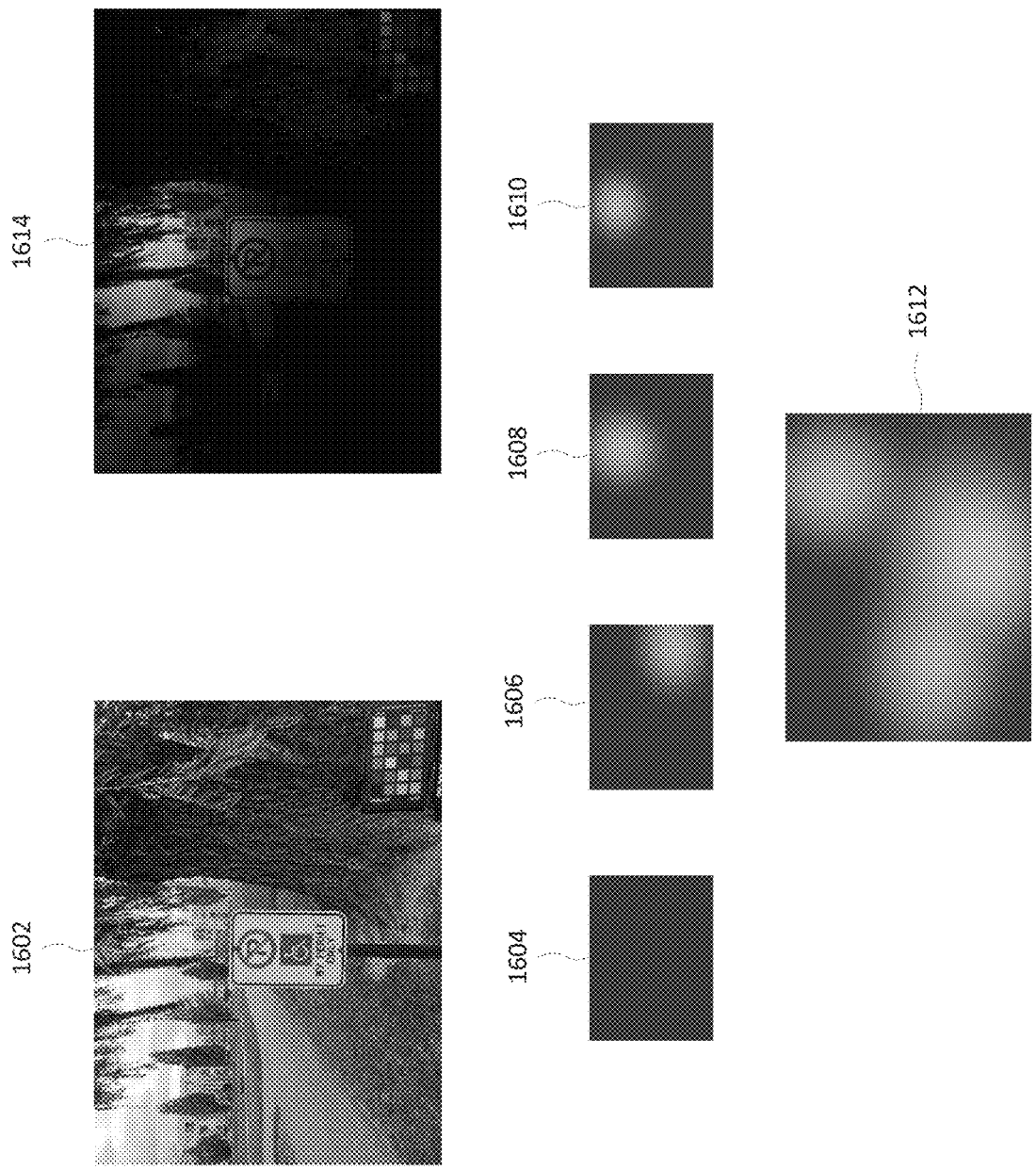
FIG. 16 is a diagram of an application of a lighting mask to a raw image, according to an embodiment.

FIG. 16 is a diagram of an application of a lighting mask to a raw image, according to an embodiment. A daytime white balanced image 1602 may be produced from a raw sensor image, and the raw sensor image may be locally relit as image 1614. The masks 1604, 1606, 1608 and 1610 may be combined to form a combined mask 1612, and the combined mask 1612 may be applied to form locally relit image 1614.

FIG. 17 is a diagram showing examples of applying amounts of nighttime illumination to images, according to an embodiment. Image 1702 is an example of a daytime white balanced image rendered from the raw sensor image, and image 1704 is an example of the raw sensor image with the daytime illumination removed. The system may determine locations of lights or windows or other objects in the image that generate and/or reflect light, thereby providing a light source within the image when the objects are active. In image 1706, the raw image is relit based on illumination samples. Image 1706 may be rendered to produce a nighttime clean image, as in image 1708. In image 1706 and 1708, local illuminants are applied to locations of lamps, such as lamp 1710, to simulate the nighttime illumination.

In operation 512, the system may output the clean raw image with applied nighttime illumination. The system may set the output clean raw image as a ground-truth image for later training of a neural network.

FIG. 18 is a diagram of an application of noise to an image, according to an embodiment. In operation 514, the system may apply noise to the raw image with the applied nighttime illumination. For example, image 1802 is a clean image with nighttime illumination applied, and the system may apply noise to the image 1802 to produce image 1804. The system may apply noise to the image 1802 based on noise parameters from a target sensor. That is, the noise may be signal-dependent. By applying noise to the image 1802, an image may be generated that simulates sensor infractions when capturing a nighttime image.

The image $I_{night}$ may represent a high-quality long-exposure, low-ISO nighttime image. Adding noise to $I_{night}$ produces a low-quality, short-exposure, high-ISO nighttime image. The noisy raw image may be generated as in Equation (4):

$$\tilde{I}_{night} \leftarrow I_{night} + \mathcal{N}(0, \beta_1 I_{night} + \beta_2) \qquad (4)$$

where $\beta_1$ and $\beta_2$ are the shot and read noise parameters, respectively. $\beta_1$ and $\beta_2$ may be empirically determined for different ISO levels based on measuring the noise of real noisy/clean nighttime image pairs.

In operation 516, the system outputs the raw image with the applied noise. The system may set the image with the applied noise as a degraded nighttime image and train a neural network based on the ground-truth image being the target image that was output at operation 512.

Figure 19:
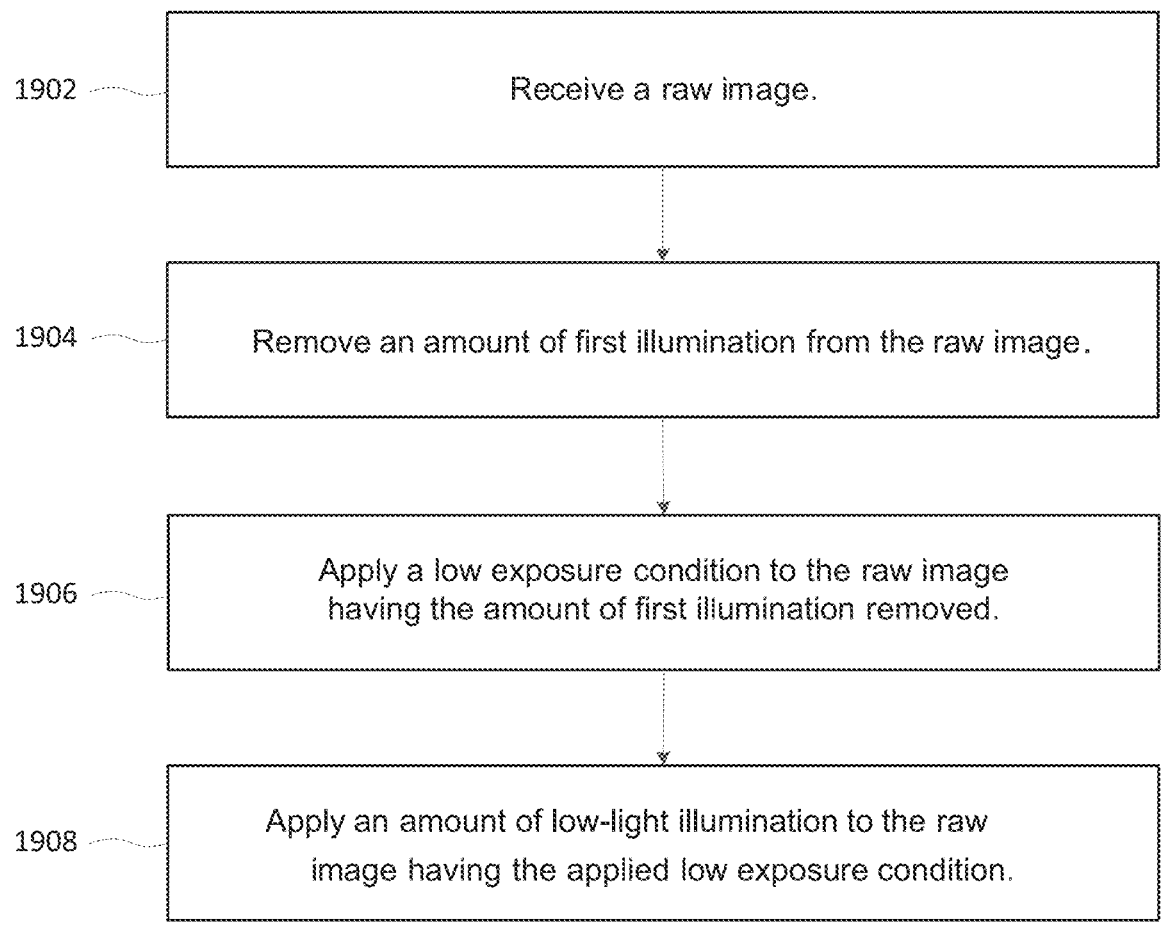
FIG. 19 is a flowchart of a method for generating low-light images, according to an embodiment.

FIG. 19 is a flowchart of a method for generating low-light images, according to an embodiment. In operation 1902, the system receives a raw image. In operation 1904, the system removes an amount of first illumination from the raw image. In operation 1906, the system applies a low exposure condition to the raw image having the amount of first illumination removed. In operation 1908, the system applies an amount of low-light illumination to the raw image having the applied low exposure condition.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating a low-light image, comprising:
   obtaining a raw image captured by a sensor;
   removing an amount of first illumination from the raw image;
   applying a low exposure condition to the raw image having the amount of first illumination removed;
   obtaining a low-light image by applying an amount of second illumination less than the amount of first illumination to the raw image having the applied low exposure condition;
   obtaining a noisy image by applying an amount of noise to the low-light image having the applied amount of second illumination; and
   training a neural network model for denoising an image based on the low-light image and the noisy image.

2. The method of claim 1, wherein the amount of low-light illumination comprises an amount of nighttime illumination.

3. The method of claim 1, wherein obtaining the low-light image comprises applying a single global illuminant to the raw image having the applied low exposure condition.

4. The method of claim 1, wherein obtaining a low-light image comprises applying a plurality of local illuminants to the raw image having the applied low exposure condition.

5. The method of claim 4, further comprising detecting at least one position of a light source in the raw image,
   wherein at least one of the plurality of local illuminants is applied to the at least one detected position of the light source.

6. The method of claim 1, wherein the amount of second illumination is applied based on an ambient light mask with a predetermined color and predetermined scale.

7. A system for generating a low-light image, comprising:
   a memory storing instructions; and
   a processor configured to execute the instructions to:
      obtain a raw image captured by a sensor;
      remove an amount of first illumination from the raw image;
      apply a low exposure condition to the raw image having the amount of first illumination removed;
      obtain a low-light image by applying an amount of second illumination less than the amount of first illumination to the raw image having the applied low exposure condition;
      obtain a noisy image by applying an amount of noise to the low-light image having the applied amount of second illumination; and
      train a neural network model for denoising an image based on the low-light image and the noisy image.

8. The system of claim 7, wherein the amount of low-light illumination comprises an amount of nighttime illumination.

9. The system of claim 7, wherein the processor is further configured to apply a single global illuminant to the raw image having the applied low exposure condition.

10. The system of claim 7, wherein the processor is further configured to apply a plurality of local illuminants to the raw image having the applied low exposure condition.

11. The system of claim 10, wherein the processor is further configured to execute the instructions to detect at least one position of a light source in the raw image,
    wherein at least one of the plurality of local illuminants is applied to the at least one detected position of the light source.

12. The system of claim 7, wherein the amount of second illumination is applied based on an ambient light mask with a predetermined color and predetermined scale.

13. A non-transitory computer-readable storage medium configured to store instructions that, when executed, cause at least one processor to:
- obtain a raw image captured by a sensor;
- remove an amount of first illumination from the raw image;
- apply a low exposure condition to the raw image having the amount of first illumination removed;
- obtain a low-light image by applying an amount of second illumination less than the amount of first illumination to the raw image having the applied low exposure condition;
- obtain a noisy image by applying an amount of noise to the low-light image having the applied amount of second illumination; and
- train a neural network model for denoising an image based on the low-light image and the noisy image.

14. The storage medium of claim 13, wherein the amount of low-light illumination comprises an amount of nighttime illumination.

15. The storage medium of claim 13, wherein the instructions, when executed, further cause the at least one processor to apply a single global illuminant to the raw image having the applied low exposure condition.

16. The storage medium of claim 13, wherein the instructions, when executed, further cause the at least one processor to apply a plurality of local illuminants to the raw image having the applied low exposure condition.

17. The storage medium of claim 16, wherein the instructions, when executed, further cause the at least one processor to detect at least one position of a light source in the raw image,
wherein at least one of the plurality of local illuminants is applied to the at least one detected position of the light source.

* * * * *